2,324,098

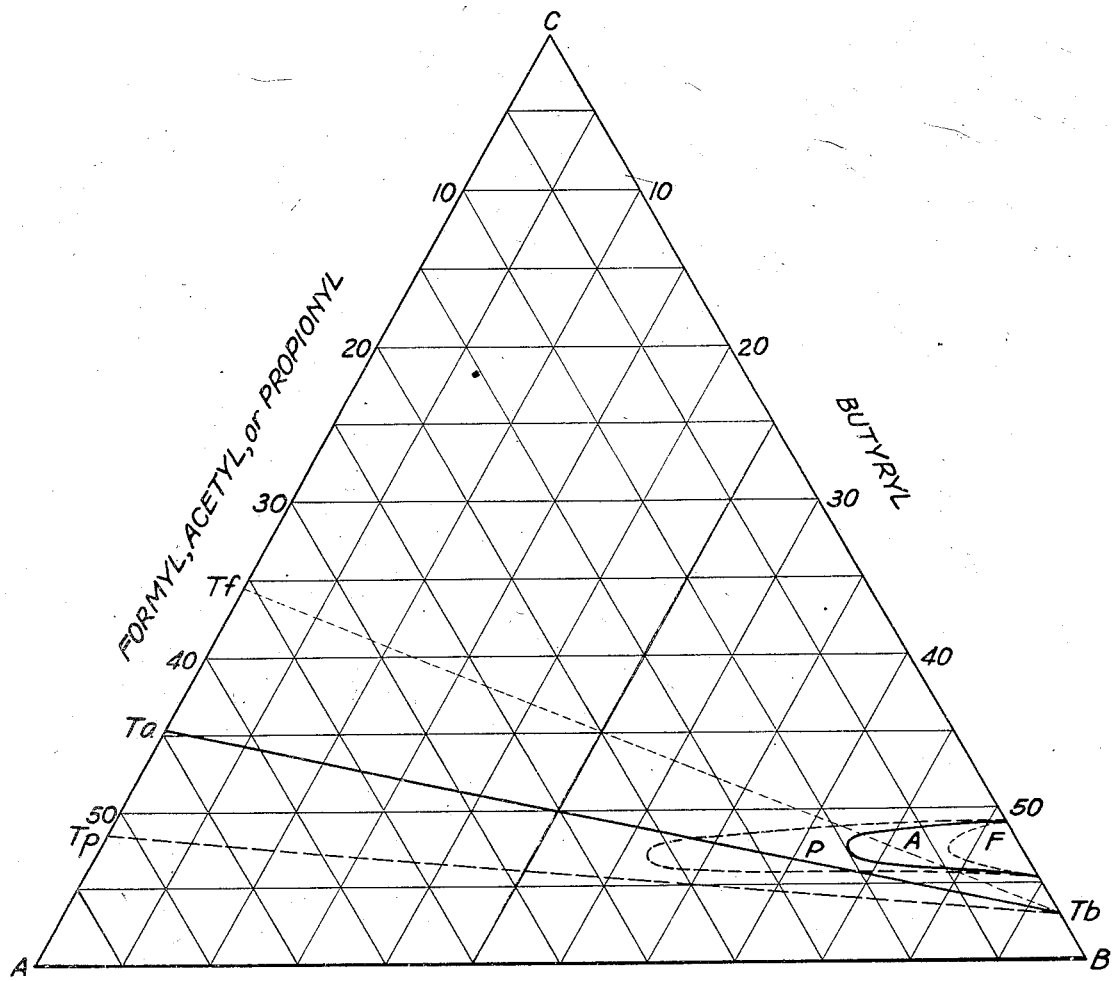
AREA F – CELLULOSE FORMATE BUTYRATE.
AREA A – CELLULOSE ACETATE BUTYRATE.
AREA P – CELLULOSE PROPIONATE BUTYRATE.
CARL J. MALM
GERARD J. CLARKE
INVENTORS Patented July 13, 1943

UNITED STATES PATENT OFFICE 2,324,098

DIPPING LACQUER

Carl J. Malm and Gerard J. Clarke, Rochester, N. Y., assignors to Eastman Kodak Company, Rochester, N. Y., a corporation of New Jersey Application December 31, 1941, Serial No. 425,168

4 Claims. (Cl. 106—191)

This invention relates to coating and coating compositions and more particularly to improved high viscosity dipping lacquers in which solidification and consolidation of the lacquer coating takes place through temperature gelation as distinguished from solidification occasioned by evaporation of solvent, solvent extraction or similar means.

As is well known, dipping lacquers have been employed for many years for numerous domestic and industrial uses. One of the more common types is a lacquer in which a cellulose derivative is dissolved in a volatile solvent or solvent combination and solidifies as a coating on an article dipped therein by relatively slow drying down through evaporation of the solvent. In another type having a cellulose nitrate base, advantage is taken of the fact that lowering of the temperature raises the viscosity to a certain extent and thus facilitates coating.

More recently, coating compositions of a basically different character have been developed, such compositions being distinguished from the above-mentioned lacquer in a number of important respects, but particularly in the fact that solidification of the deposited coating takes place rather suddenly within a relatively narrow temperature range. Under such circumstances, the composition solidifies while it still contains a substantial amount of solvent. In the copending application of Charles R. Fordyce and Gerard J. Clarke, Ser. No. 370,853, filed December 19, 1940, a number of such lacquers and illustrative methods of employing them are disclosed. However, the cellulose esters which are the subject of that application are characterized by the fact that they are fully esterified and require the use of a mixed solvent to obtain solution of the ester.

Somewhat related compositions are referred to in the Malm Patent 1,997,337 in which there are described compositions in which an unhydrolyzed cellulose ester is dissolved in a mixed solvent containing a major quantity of toluene and a minor quantity of an active solvent such as acetone. In such compositions, the deposited lacquer coating solidifies or gels due to rapid evaporation of the active solvent component of the solvent mixture, namely, the acetone. The patent also refers to hot toluene solutions which remain fluid only while hot and gel upon cooling, either with or without evaporation of part of the solvent. Reference is made to a plurality of cellulose derivatives susceptible of use in these compositions, but no distinction is made between derivatives which require addition to the primary solvent of a more active solvent and those derivatives which are soluble in hot toluene alone. Specific reference is made only to the dissolving of cellulose esters of the very high molecular weight acids such as cellulose acetate palmitates and cellulose acetate stearates. However, certain limitations have been found to exist in the practical application as lacquers of these compositions. Esters such as cellulose acetate stearates exhibit relatively low viscosities in solution and even in high concentrations are highly fluid. The result is that upon withdrawal of an article which has been dipped in such a solution, most of the composition runs off before gelation can take place, thus limiting the thickness of coating which can be obtained.

The instant invention is an improvement over the compositions referred to in Patent 1,997,337 and relates solely to a very special type of composition in which certain specific cellulose esters are dissolved in hot toluene, without the use of any other solvent, to produce lacquers which are susceptible of gelation (i. e., solidification without loss of a substantial amount of solvent) merely by reduction in the temperature of the composition.

The invention accordingly has as an object to provide an improved cellulose ester dipping lacquer of the gelation type. A further object is to provide a means of producing very much tougher lacquer coatings than is possible when fully esterified cellulose esters are employed. A still further object is to provide a cellulose ester lacquer in which certain specific cellulose esters are dissolved in a solvent which requires no adjustment or rectification during use. Another object is to provide a dipping lacquer which is highly satisfactory for applying heavy coatings on wood, metal, paper, etc., and is of particular value in depositing satisfactory lacquer coatings over previously deposited coatings of the same or different cellulose esters. Other objects will appear hereinafter.

These objects are accomplished by the following invention which, in its broader aspects, comprises dissolving certain cellulose organic acid esters in a single solvent to produce a temperature gelation type lacquer which is characterized by being fluid within a relatively wide range of temperature but susceptible of solidification by gelation while containing a large amount of solvent when the solution is subjected to a temperature within the range of 10–50° C. The esters are relatively specific in composition, being hydrolyzed cellulose organic acid esters falling within the group consisting of cellulose butyrates containing from 51–55% butyryl, cellulose mixed esters of butyric acid and one or more acids of lower molecular weight such as formic, acetic or propionic acids in which esters the butyryl content is greater than 30% and the total acyl content greater than 51%, the esters in each case being hydrolyzed to at least approximately one free hydroxyl group out of 12 hydroxyl groups of the cellulose unit. In producing the lacquer the esters are dissolved in toluene at a temperature above 50° C. and thereafter are employed as dipping lacquers by immersing the object it is desired to coat in the warm solution, withdrawing the coated article and subjecting the deposited coating to a temperature sufficient to bring about solidification or gelation. As will be more fully set forth hereinafter, the compositions in question are distinguished, among other things, by the fact that they are capable of solidification or gelation while containing very large amounts (50% or more) of solvent. In fact, the compositions may be solidified while containing all or substantially all of the original solvent.

In the following examples and description, we have set forth several of the preferred embodiments of our invention, but they are included merely for purposes of illustration and not as a limitation thereof.

The single figure of the drawing is a triangular coordinate diagram in which is illustrated the constitution of the specific cellulose organic acid esters which may be dissolved in hot toluene in accordance with our invention to give dipping lacquers of the type herein described.

As indicated by this drawing, the esters we prefer to employ are certain specific hydrolyzed cellulose butyrates, cellulose formate butyrates, cellulose acetate butyrates, cellulose propionate butyrates. The composition of these preferred esters is indicated by the areas F, A, and P which indicate, respectively, cellulose formate butyrates, cellulose acetate butyrates and cellulose propionate butyrates. It will be understood that in this diagram the percent butyryl is plotted along the line CB, while the percent formyl, acetyl and propionyl is plotted along line CA. The point Tb represents cellulose tributyrate while Tf, Ta and Tp represent, respectively, cellulose triformate, cellulose triacetate and cellulose tripropionate. Accordingly, the line connecting Tf and Tb represents fully esterified cellulose formate butyrates, the line connecting Ta and Tb represents fully esterified cellulose acetate butyrates and the line connecting Tp and Tb represents fully esterified cellulose propionate butyrates.

As indicated above, the distinguishing feature of the instant invention is the fact that in each instance we employ esters from which a certain proportion of the acyl groups have been hydrolyzed, which esters we have found produce unexpectedly tougher coatings than were thought possible, judging from the results heretofore obtained when the fully esterified esters of the prior art are employed. When the cellulose mixed organic acid esters are hydrolyzed from the fully esterified stage, their solubility in toluene passes through a point of maximum solubility and it has been found that to be of maximum usefulness in the type of lacquer here under consideration, the ester should preferably be hydrolyzed through this maximum solubility to a point where it can be dissolved to form a fairly viscous solution in toluene, at a solvent-to-ester ratio of 4:1 to 6:1, at a temperature of about 50–55° C. which gels at a temperature at or above about 20° C. We have found, for example, that a fully esterified cellulose butyrate should be hydrolyzed to a butyryl content of less than 55%, while a cellulose acetate butyrate containing 49% butyryl and 6% acetyl should be hydrolyzed to 46.4% butyryl and 5.7% acetyl to obtain esters of optimum properties.

*Example 1*

A cellulose acetate butyrate containing 45% butyryl and 9.5% acetyl is hydrolyzed to 43.5% butyryl and 9.2% acetyl in accordance with the procedure outlined in the U. S. Patent to Malm and Fletcher No. 2,026,583. One part by weight of the hydrolyzed ester is then dissolved in six parts by weight of toluene at a temperature of 50° to 55° C. in accordance with standard practice. This produces an excellent temperature gelation type dipping lacquer. An object, such as a door handle, knife handle or similar object is dipped in a bath of this lacquer maintained at a temperature of about 55° C. and slowly withdrawn. The article is found to have a heavy coating of the lacquer deposited thereon. When the deposited coating is cooled in air maintained at a temperature of about 20° to 25° C., the coating sets by gelation and upon removal of residual solvent, a tough, firm, durable, closely-adhering lacquer coating is found to be deposited upon the article.

*Example 2*

A cellulose butyrate containing 57% butyryl is hydrolyzed to 52% butyryl. One part by weight of the hydrolyzed ester is dissolved at a solvent-to-ester ratio of 6:1 in hot toluene in accordance with the procedure outlined in Example 1. An excellent dipping lacquer having substantially the same characteristics as that of the composition of Example 1 is thus obtained.

While no hard and fast rules can be laid down with respect to the composition of the cellulose esters which will produce satisfactory dipping lacquers in accordance with the instant invention, it may be said that all of such esters fall within one or more of the areas F, A, and P of the single figure of the drawing. We have found that a hydrolyzed cellulose butyrate of 51–55% butyryl and a cellulose acetate butyrate of not more than 10% acetyl and having from 51–55% total acyl, give outstandingly excellent results when employed as the base in dipping lacquer compositions in accordance with the procedure outlined herein.

The solution viscosity of the lacquer is a matter of some importance, but this may be varied over a rather wide range. In any event, the particular viscosity selected will be determined largely by the particular use for which the lacquer is intended, the size, shape, and nature of the object dipped and many other factors. In general, and for most ordinary industrial applications, the viscosity may range from 500 to 5,000 centipoises. This solution viscosity may of course be controlled, not only by the solvent-to-ester ratio employed, but also by the temperature at which the lacquer is maintained when objects are dipped therein. In general, we have found that optimum results are obtained when the ester is dissolved in from 4–6 parts of solvent, and dipping temperatures of 50–55° are maintained.

It will of course be understood that any desired coloring materials such as pigments, dyes, metal powder and other effect materials may be added to the lacquer compositions to produce any desired coloration. For most purposes we may employ the lacquer without any further additions, but where a flexible and somewhat softer surface is desired, small amounts of any appropriate cellulose ester plasticizer can be added. Similarly, resins may be added to the composition in order to increase the ability of the deposited compositions to adhere to surfaces to which they are applied.

As previously stated, due to the presence of free hydroxyl in the cellulose ester, unexpectedly tough and durable coatings can be obtained by application of the particular compositions which are the subject of the instant invention. Another outstanding feature is the fact that, because the solvent is relatively inactive at the temperatures employed and does not attack previously deposited coatings, a series of layers may be built up one upon the other without the development of ridges or the production of thin spots, as is the case with cellulose derivative dipping lacquers of the prior art in which the solvent drastically attacks the undercoat. In fact, coatings of any desired thickness may be built up in this fashion, ranging from a few thousandths of an inch to almost any desired thickness. The successive coatings thus deposited simply solidify or gel under the influence of the lowered temperature and shrink down, upon loss of solvent, to form tight, shrunk-on layers which merge one into another and constitutes to what is, to all intents and purposes, a continuous lacquer layer. Not only may thick, tough layers be built up by successive applications of the lacquer, but one of the outstanding features of our invention is the fact that much heavier initial coats may be deposited, because of the higher viscosity of the cellulose ester material which may be employed, than is the case with ordinary lacquers. For example, it is possible with our lacquers to deposit single coats from 15 to 20 thousandths of an inch in thickness, whereas about 2-3 thousandths of an inch is the maximum thickness attainable with lacquer compositions based on the fully esterified mixed organic acid esters.

What we claim is:

1. A dipping lacquer comprising one part by weight of a hydrolyzed cellulose organic acid ester selected from the group consisting of cellulose butyrates containing from 51-55% butyryl, cellulose formate butyrates, cellulose acetate butyrates, cellulose propionate butyrates, in which the butyryl content is greater than 30% and the total acyl content is greater than 51%, said esters being hydrolyzed to at least approximately one free hydroxyl group per 12 hydroxyls of the cellulose unit, dissolved in approximately 4 to approximately 6 parts by weight of toluene, said lacquer being capable of solidification by gelation while containing all or substantially all of the original solvent content when cooled to a temperature within the range of 10-50° C.

2. A dipping lacquer comprising one part by weight of a hydrolyzed cellulose acetate butyrate, falling within shaded area A of the drawing, dissolved in approximately 4 to approximately 6 parts by weight of toluene, said lacquer being capable of solidification by gelation while containing all or substantially all of the original solvent content when cooled to a temperature within the range of 10-50° C.

3. A dipping lacquer comprising one part by weight of a hydrolyzed cellulose butyrate containing 51-55% butyryl falling within shaded area of the drawing dissolved in approximately 4 to approximately 6 parts by weight of toluene, said lacquer being capable of solidification by gelation while containing all or substantially all of the original solvent content when cooled to a temperature within the range of 10-50° C.

4. A dipping lacquer comprising one part by weight of a hydrolized cellulose acetate butyrate containing between 51 and 55% total acyl and more than 40% butyryl, dissolved in approximately 4 to approximately 6 parts by weight of toluene, said lacquer being capable of solidification by gelation while containing all or substantially all of the original solvent content when cooled to a temperature within the range of 10-50° C.

CARL J. MALM.
GERARD J. CLARKE.